United States Patent [19]

Myer

[11] 3,864,671

[45] Feb. 4, 1975

[54] PACKAGE STRUCTURE FOR MOVABLE MAGNETIC DOMAIN DEVICES

[75] Inventor: Jon H. Myer, Woodland Hills, Calif.

[73] Assignee: Hughes Aircraft Company, Culver City, Calif.

[22] Filed: Apr. 10, 1972

[21] Appl. No.: 242,475

[52] U.S. Cl. ................ 340/174 MA, 340/174 PM, 340/174 TF

[51] Int. Cl. ................ G11c 11/14

[58] Field of Search .............. 340/174 PM, 174 TF, 340/174 MA, 174 CC; 336/90, 110, 133

[56] References Cited

UNITED STATES PATENTS

| | | | |
|---|---|---|---|
| 2,942,240 | 6/1960 | Rajchman et al. | 340/174 CC |
| 3,087,131 | 4/1963 | Babcock et al. | 336/133 |
| 3,513,452 | 5/1970 | Bobeck et al. | 340/174 TF |
| 3,696,345 | 10/1972 | Visschedijk | 340/174 PM |
| 3,699,552 | 10/1972 | DeFabritis | 340/174 TF |
| 3,711,841 | 1/1973 | Geusic | 340/174 TF |

FOREIGN PATENTS OR APPLICATIONS

| | | | |
|---|---|---|---|
| 965,596 | 8/1964 | Great Britain | 340/174 PM |

OTHER PUBLICATIONS

Electronics, "Magnetic Bubbles–a Technology in the Making," by Karp, 9/1/69, p. 83–87.

IBM Tech. Disc. Bull. "Orthoferrite Memory," by Hultmark, Vol. 13, No. 12, 5/71, p. 3704.

*Primary Examiner*—Stanley M. Urynowicz, Jr.
*Attorney, Agent, or Firm*—W. H. MacAllister, Jr.; Donald C. Keaveney

[57] ABSTRACT

There is disclosed a package or housing structure for signal translating or memory devices employing cylindrical magnetic domains (commonly called bubbles) in uniaxially anisotropic magnetic mediums such as single crystal platelets for the processing digital information. The package is such as to combine the functions of electrical termination of drive and sense circuitry for such magnetic bubble devices with a packaging structure which simultaneously provides the permanent magnetic bias needed for the operation of these devices. The package structure is fabricated from a material that combines the properties of electrical insulation and magnetic remanence and is shaped to provide not only a protective housing but also a magnet configuration which generates the required bias field. The material preferably forms both a high coercivity permanent magnet and an electrical insulator and may, for example, be one of the barium ferrite ceramics.

5 Claims, 7 Drawing Figures

PACKAGE STRUCTURE FOR MOVABLE MAGNETIC DOMAIN DEVICES

BACKGROUND OF THE INVENTION

1. Field of the Invention

In my copending U.S. patent application Ser. No. 205,095 filed Dec. 6, 1971 now U.S. Pat. No. 3,806,903 entitled "Magneto-Optical Devices," I have disclosed a class of signal translating devices employing cylindrical magnetic domains in uniaxially anisotropic magnetic media such as single crystal platelets or films appropriately formed from orthoferrite or garnet crystals. Specifically different devices which also use such magnetic domains have been described in an article which appeared in the June 1971 issue of the magazine "Scientific American" written by A. H. Bobeck and H. E. D. Scovil and entitled "Magnetic Bubbles." In my aforesaid patent application, I have described biasing and housing arrangements which are particularly suited for such devices when optical readout techniques are to be used for devices requiring bias fields which are adjustable at least during manufacture. As has been noted in the Bobeck article, other readout techniques such as electrical induction or magnetoresistive sensing may in certain applications be a desirable alternative. Specific configurations utilizing such magnetoresistive readout for data processing arrays are disclosed and claimed in my copending application entitled "MAGNETORESISTIVE READOUT FOR DOMAIN ADDRESSING INTERROGATOR" filed concurrently herewith Apr. 10, 1972, under Ser. No. 242,474 now U.S. Pat. No. 3,806,899 and assigned to the same assignee as the persent application.

The packaging-biasing-electrical connector structure disclosed and claimed herein is suitable for use with any of the devices of the class described either in the Bobeck article or in my previously filed application Ser. No. 205,095, or in my above application filed concurrently herewith.

2. Prior Art

In U.S. Pat. No. 3,513,452 issued to A. H. Bobeck et al., there is disclosed a device utilizing inductive readout from a crystal platelet in which single wall domains or magnetic bubbles are moved to represent digital information. As noted therein in line 19 of colum 3, and in the above noted Bobeck article, these devices require a magnetic bias field which Bobeck indicates only symbolically by a rectangular sheet labeled M stating that the magnetic bias field may be "generated conveniently by magnet M." This of course restates a general principle which has long been well known but as to specific detail leaves much to the inventive imagination of later workers in the art. The Bobeck article is similarly uninformative as to detail.

In my copending application Ser. No. 205,095 there is disclosed an elevator housing within which such platelets may be mounted and which may be used to support ring magnets at a precisely adjustable position necessary to the operation of the devices. In the commercial production of some forms of these devices, this adjustable housing is more complex than is necessary. On the other hand, the presumably unattached permanent magnet M shown by Bobeck is apparently externally supported in an unknown manner for laboratory experiment and does not teach enough detail to be useful as a commercial structure. Commercially available microcircuitry packages for semiconductors are not compatible with these magnetic devices.

SUMMARY OF THE INVENTION

The present invention relates to a housing for such magnetic bubble devices which is suitable for commercial use. The housing or package including the insulating connecting base structure is fabricated from a material that combines the properties of electrical insulation and magnetic remanence. This material is preferably a ceramic which has high coercivity permanent magnetic properties as well as electrical insulating properties and which can be fabricated into delicate and complex shapes by power-compacting and sintering techniques to permit a great variety in the structural design of the device. The barium ferrites are, for example, one class of materials from which it is possible to fabricate round or square connector frames which are also ring magnets so as to obtain the dual function of termination of the bubble device circuits and provision of permanent magnet bias for the incorporated bubble domains or chips. Alternately, the electrically insulating magnetically biasing body of my invention could be made from a thermoplastic or thermosetting compound which incorporates a remanent ferrite particle powder filler. It is preferred to maintain a transparent central aperture to permit visual inspection of the device by Faraday effect during and after manufacture for quality control purposes even though non-optical readout techniques may be used.

BRIEF DESCRIPTION OF THE DRAWINGS

The invention will be better understood from the detailed description below taken in conjunction with the drawings attached hereto in which like reference characters refer to like parts throughout and wherein.

DETAILED DESCRIPTION OF THE INVENTION

Figure 1:
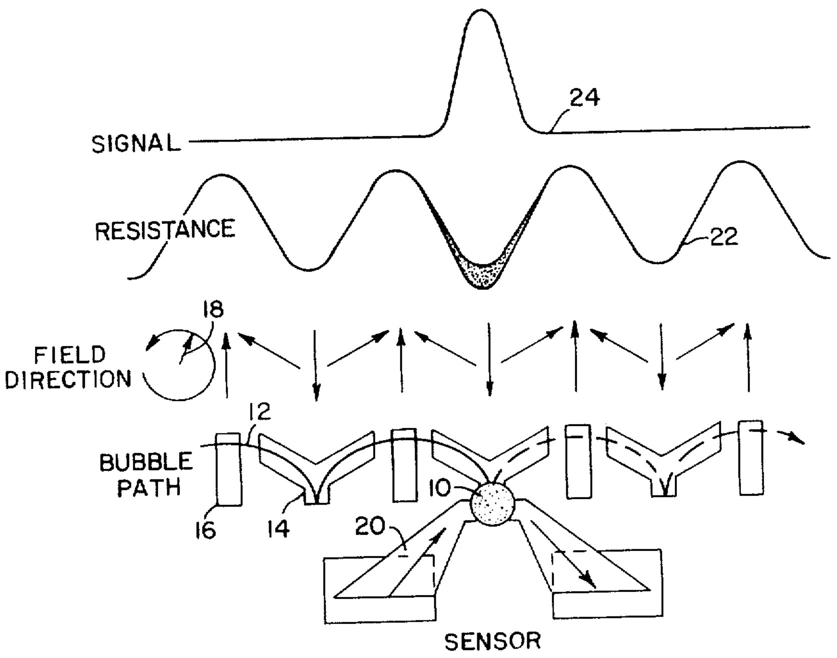
Fig.1.(Prior Art)
FIG. 1 is a reproduction of an illustration appearing on page 87 of the above noted "Scientific American" article illustrating the operation of one type of conventional prior art device for which the package disclosed herein provides a suitable housing.

Turning now to the drawings there is shown in FIG. 1 a schematic illustration of the mode of operation of a bubble detector or sensor employing the principle of magnetoresistive sensing in a serially operated magnetic bubble data processing device. This illustration is reproduced from the illustration on page 87 of the June 1971 issue of the magazine "Scientific American" and was part of an article entitled "Magnetic Bubbles" by Bobeck and Scovil. The article describes in detail how a sheet of magnetic material such as a garnet or an orthoferrite is divided into regions that are magnetized in different directions. A magnetic bias field is maintained perpendicularly to the plane of a sheet of such magnetic material. The domains are then formed in small cylindrical bubbles having a field directed antiparallel to the direction of the bias field. These bubbles can readily be moved in two dimensions in the sheet of magnetic material and can therefore be utilized in computer memories, shift registers, and the like. The movable magnetic domains remain stable only so long as the magnetic bias field remains within predetermined limits. As is well known, if the bias field becomes too large or too small the cylindrical domains will collapse and disappear entirely or revert to larger elliptical or sepentine single wall domains.

In FIG. 1 such a cylindrical domain or magnetic bubble 10 is shown being guided along a plurality of predetermined positions serially located along a path indicated by the line 12. This path is defined by a Permalloy film pattern of Y's and bars. These Permalloy soft magnet elements 14 and 16 deposited in close proximity of the surface of the magnetic wafer of orthoferrite or garnet concentrate an external rotating field and form induced salient poles which move the bubble along the path and thus stepping it through the shift register. The rotating arrow 18 indicates the directon of this external rotating field and is represented in its various possible positions corresponding to the location of the bubble at various stable points in the path. The position in which the bubble 10 is shown is a readout position defined by the presence of a thin Permalloy film sensor element 20. The detector 20 is a Permalloy film pattern whose resistance to a flow of direct current varies sinusoidally in response to the externally generated rotating magnetic field that moves the bubble. The variations in resistance is shown by the graph line 22 which plots its value as a function of the correspondingly indicated field direction. When the bubble 10 is moved by the external field along the path and lands under the Permalloy film pattern, the resistance is reduced by an additional amount due to the magnetic field of the bubble, thus giving rise to an output signal as is shown in graphical plot 24. The readout in this serial mode of operation is non-destructive and the bubble continues on its way. The digital information is of course represented as a one for those time-position locations in which a bubble is percent and as a zero when no bubble is present.

A 10,000 step shift register of this type may be contained on a chip which is no more than one-tenth of an inch on a side. Of course larger chips or a plurality of chips may be used in more complex arrangements. In any of these arrangements, however, the physical dimensions involved are of the order of magnitude customarily thought of as comprising microminiaturized circuit devices. As such, they present all of the fabrication problems encountered in any microcircuit device. In colum 2 of page 85 of this article, for example, Bobeck in considering the relative merit of rotating field access or conductor access states that "the trouble with conductor methods is that a great many accurately placed conductors whos dimensions are comparable to the size of bubbles must be interconnected with external access circuits." While he correctly notes that the field access method illustrated simplifies this problem, it does not eliminate it and in many devices the conductor access mode of moving the bubble is preferable for other reasons. It is therefore desirable to provide a packaging device which will provide the necessary bias field and also facilitate connection of one, a few, or many device circuits to external access circuits.

Figure 2B:
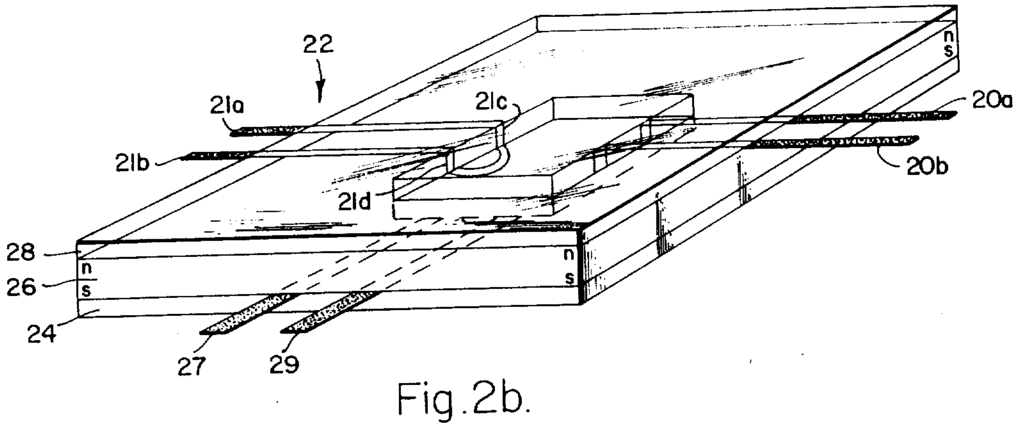
FIG. 2*b* is an assembled view of the device of FIG. 2*a* also showing the application of an encapsulation top layer.
Figure 2A:
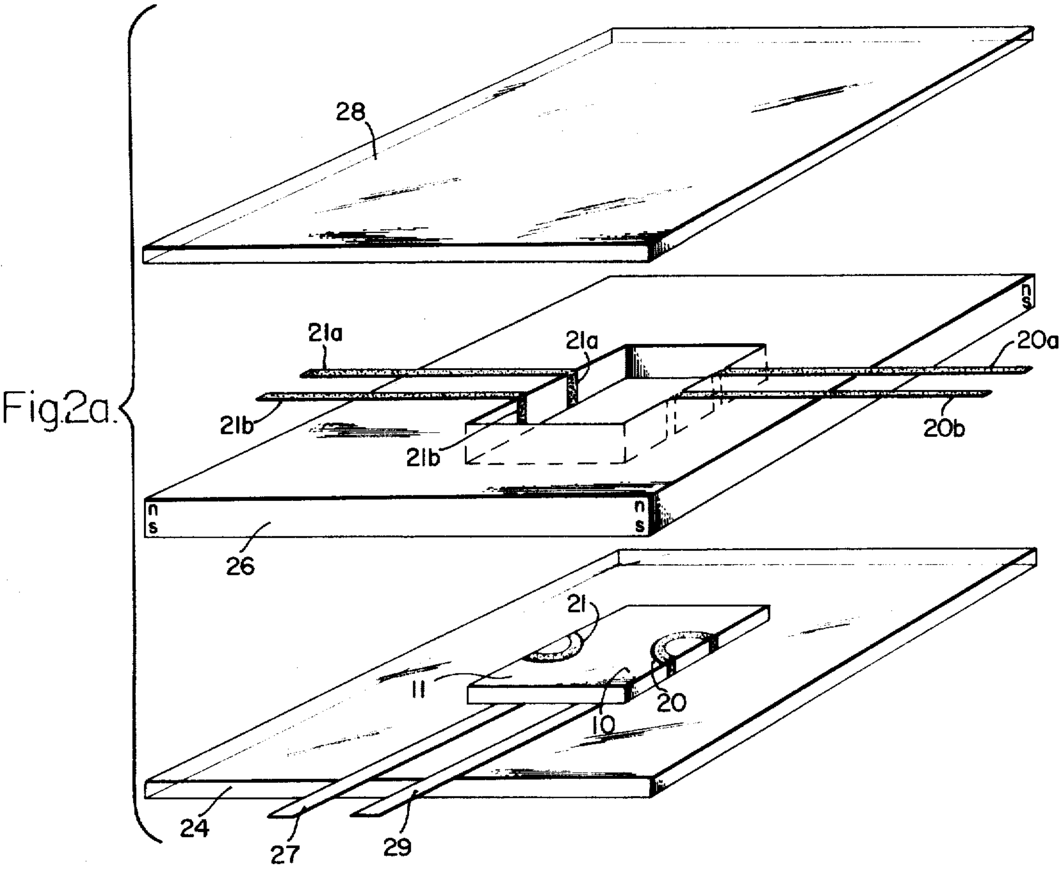
FIG. 2*a* is an exploded perspective view of a simple form of mounting and packaging arrangement.

One geometrically simple configuration for such a package is shown in exploded perspective view in FIG. 2*a* and in an assembled perspective view in FIG. 2*b*. This package 22 comprises a glass or other transparent substrate 24 on which a chip or platelet 11 of a magnetic domain supporting crystal such as garnet or orthoferrite is mounted. The platelet or magnetic wafer 11 contains one or more magnetic bubble cylindrical domains 10 which are to be manipulated as discussed above in connection with FIG. 1. The magnetoresistive sensor element 20 is deposited on the platelet 11 or on the substrate 24 by conventional photolithographic or deposition techniques. Although any conventional bubble device may be formed on plate 11, there is shown by way of symbolic illustration a similarly shaped electrical conductor 21 to apply write signals to such a device. The magnetic wafers or platelets 11 of these types of devices are generally square in configuration and may be mounted on a larger transparent substrate 24 which is illustrated as also having a substantially square configuration with the plate mounted centrally thereof. The platelet 11 may be attached to the substrate 24 by epoxy or any other convenient but preferably transparent adhesive.

If devices of the class described in my copending application Ser. No 205,095 are to be fabricated from such a platelet 11, then the necessary bit position defining conductors may be deposited or otherwise formed on the upper surface of the substrate 24 and can have their leads fanning out to the edges thereof. A single pair of such leads 27 and 29, is shown by way of example only in the device of FIG. 2*a* as being deposited on the upper surface of substrate 24. In the serial shift register type of device being illustrated these could be bubble generator or other control leads. They are shown merely to illustrate the possible variation of access points for bubble control provided by packaging such devices in the package disclosed herein.

The magnetic frame member 26 which forms the sides of the package in this embodiment is formed from a material which has the dual properties of being both a high coercivity permanent magnet and an electrical insulator. For devices made from the preferred orthoferrite crystals, the bias field established by the magnetic member 26 must normally be in the range of 15 to 80 oersteds. The coercivity of this permanent magnet should normally be such that an externally applied field must be greater than 100 oersteds or, equivalently, 8,000 ampere turns per meter before it will affect or change the permanent magnetic properties of the member.

Several permanent magnet ceramics are available which do combine these properties. For example, barium ferrites sold under such trade names as INDOX and ARNOX are ideally suited for this purpose. ARNOX is a trade name of a barium ferrite ceramic material sold by the Ogallala Electronics Division of the Armold Engineering Co., Post Office Box 59, Ogallala, Nebr. 69153. INDOX is a trade name of barium ferrite ceramic material manufactured by Indiana General Corporation and available from Permag Pacific Corporation at 5441 W. 104th St., Los Angeles, Calif. Alternate materials which could meet the requirements of my invention are plastic composites which incorporate magnetic ferrite particle fillers.

The member 26 is preferably fabricated as a circular ring or square connector frame from such materials. The central aperture which is flooded by the bias field of the magnetic toroid body member 26 serves as the interior of the package the side walls of which are formed by the magnetic member. The substrate 24 is preferably transparent in order to maintain a transparent central aperture in which the wafer 11 is positioned after the substrate 24 is epoxy bonded to magnetic member 26 so that the wafer 11 is supported in the central aperture of magnetic member 26 and may be visually inspected by the Faraday effect during and after manufacture. To this end, a transparent cover 28 is also ultimately epoxy bonded to the top surface of the magnetic member 26 after appropriate lead connections have been made and the remaining space of the central aperture filled if desired by any transparent potting resin such as clear epoxy. This then forms a completely solid package containing solid state elements which may be visually inspected through the transparent central aperture in which the active device is located and which is flooded with the magnetic bias field obtained from the remanent field in the magnetic square ring 26.

It should be noted that the preferred permanent magnet ceramics such as the barium ferrites can be fabricated into delicate and complex shapes by powder compacting techniques permitting great variety in the structural design of these devices. These materials are refractive and thus permit the use of adhesives or bonding materials such as epoxy. Of course, if it is desired, a low melting solder glass frit may be used to bond the magnetic member 26 to the glass substrate 24, but the use of such frits is not necessary in this package as it is in the fabrication of "flat pack" or dual in-line packages for semi-conductor devices since magnetic bubble devices are insensitive to trace impurities and do not change their magnetic properties when exposed to non-magnetic contaminants.

In the manufacture of a device such as shown in FIGS. 2a and 2b, the magnetic domain supporting wafer 11 is first fabricated as required including the deposition thereon of drive conductors or sensor elements as required. The mangetoresistive film element 20 is typical of Permalloy. The illustrative write conductor 21 together with the typical drive conductors 27 and 29 are preferably of good electrical cconductors such as copper, silver gold or aluminum. Similar electrical conductor members **21*a* and 21*b* and 20*a* and 20*b* are also deposited on the upper surface of the magnetic member 26 and have portions such as the portion 21*c* and 21*d* extending them respectively down the inner wall of the square ring 26 to a position such that they will abut the conductor 21 on the wafer 11 when the member 26 is placed on the substrate 24 in surrounding relationship to the wafer 11. Electrical connection of this but joint may then be made by well known techniques such as electron beam welding laser welding, soldering, or the like. The conductors 20*a*, 20*b*, 21*a*, 21*b*, 21*c* and 21*d* are also of highly conductive materials such as copper, silver, gold or aluminum and will bond directly onto the surface of the electrically insulating magnetic member 26. When the electrical connections have been made as described above to the conductors on the wafer 11, any remaining void in the central aperture together with the void spaces such as between the electrical conductors 21*a* and 21*b* on the surface of member 26 may be filled with the epoxy potting or bonding resin which is used to seal the transparent cover member 28 to the upper surface of the magnetic ring member 26 forming the sides of the package. The leads such as 27, 29, 21*a*, 21*b*, 20*a* and 20*b* project out of the sides of the package as shown. Of courde it will be understood that the pairs of leads shown are illustrative only and that the leads may be continuous through the gap of the magnetic member 26 to be directly bonded to the terminals of the active platelet 10 at 20 and 21** and that any desired number of leads may be used depending upon the design of the particular device, the fabrication techniques available, and the like. These factors are entirely analogous to current design factors in the microelectronics art.

Figure 5:
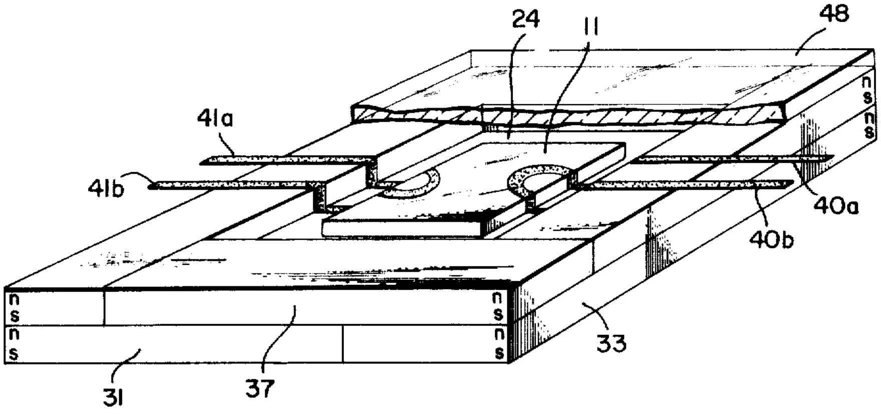
FIG. 5 is a perspective view showing complete assembly of the package of FIG. 3.
Figure 3:
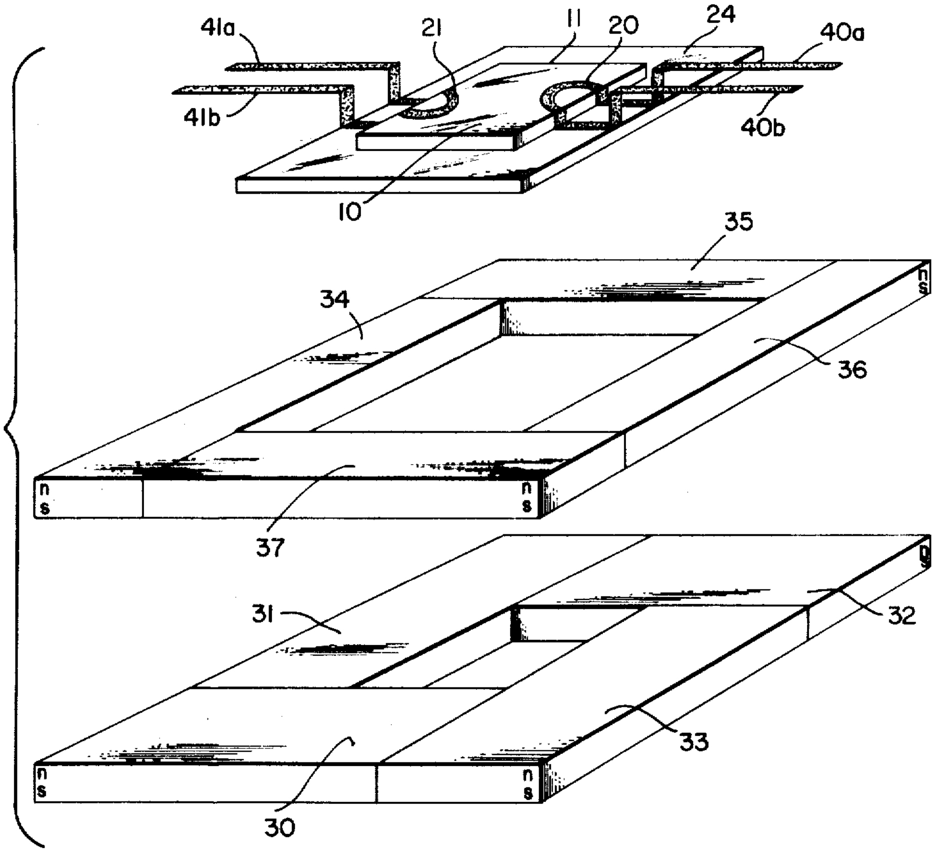
FIG. 3 is an exploded perspective view of a second form of packaging arrangement.
Figure 4:
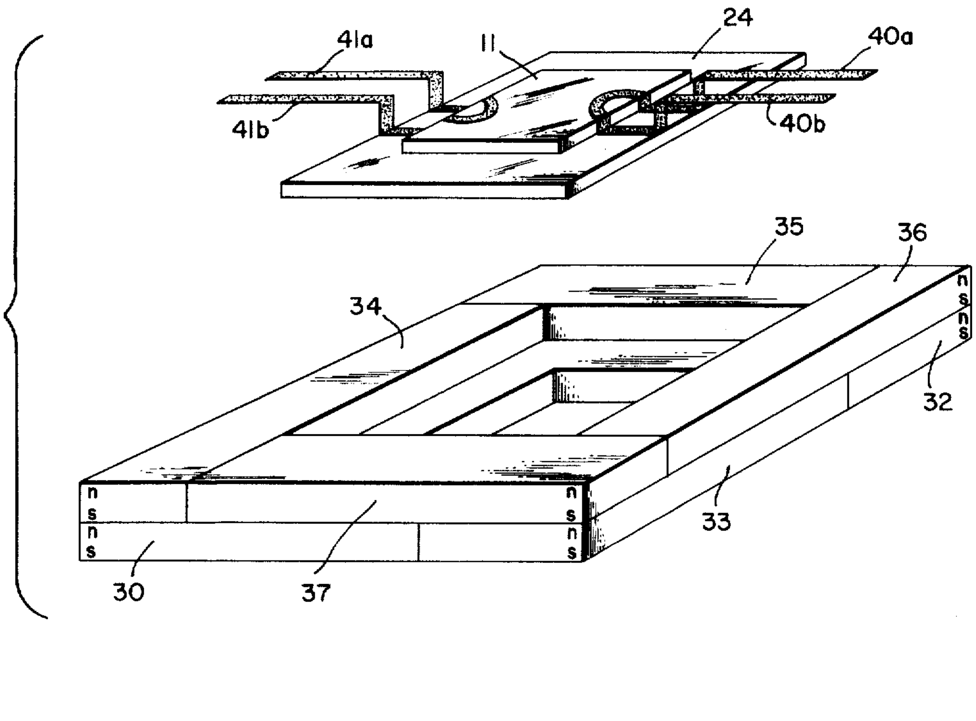
FIG. 4 is a perspective view showing partial assembly of the package of FIG. 3.

Packaging structures such as have been discussed above may be formed in many different but equivalent shapes and by other fabrication techniques. In FIGS. 3, 4 and 5 there is shown a package configuration suitable for mounting the magnetic wafer 11 and glass plate 24 where it is desired to custom fabricate a package in order to precisely align magnetic field distribution or to vary packaging dimensions. In FIG. 3 it will be noted that four magnetic members 30, 31, 32 and 33 are arranged to form a square pattern having a square central aperture. The bar members 30, 31, 32 and 33 are of the same magnetic material as has been discussed above for the member 26 of the device 22, namely remanent ferrites or ferrite composites. Bars of these rectangular shapes can be purchased commercially in various sizes and can be stocked for custom fabrication. After magnetization to adjust the magnetic remanence to a desired value the four bar members are positioned as shown in FIG. 3 with the abutting surfaces bonded together by epoxy or any other suitable adhesive.

A second set of another four rectangular bar members 34, 35, 36 and 37 are similarly positioned to form a square of the same outer diameter as the square formed by the members 30 through 33. By virtue of the fact that the second set of bars is narrower than first set individually, however, the central aperture formed by these bars will be larger than that formed by the first set of bars and preferably of the same dimensions as the plate 24. The second set of bars is similarly bonded at their butt joints.

From FIG. 4 it will be seen that the assembly formed by the second set of bars is next positioned on top of the base assembly formed by the first set of bars to form the side walls of a package member having a centrally apertured active device supporting base member (30, 31, 32 and 33) and side walls (34, 35, 36 and 37) surrounding the active device which is to be positioned in the central recess formed by the side walls. The plate 24 on which the magnetic wafer 11 is mounted is next positioned in the central recess surrounded by the members 34, 35, 36 and 37 and is thereby supported on the base member with the central aperture therein aligned with the magnetic wafer 11 for visual inspection.

It will be noted from FIGS. 3 and 4 that the lead wires **40*a* and 40*b* to the sensor element 20 and the lead wires 41*a* and 41*b* to the drive member 21 are in this version first attached to the glass plate 24 and shaped to have output portions which will abut against the inner edges and upper surfaces of the blocks 36 and 34 respectively when the device is assembled as shown in FIG. 5. The manner of such assembly is readily seen to comprise the steps of bonding the four base blocks together, next bonding the four side blocks together, next bonding the side assembly to the base assembly, and next positioning the plate 24 supporting the wafer 11 in the package base and walls thus formed with the lead members 40***a*, 40*b*, 41*a* and 41*b* extending upwardly and outwardly over the side walls. A transparent cover member which may be of glass or any similar substance is then epoxy bonded to the upper surfaces of the blocks 34, 35, 36 and 37 with epoxy filling in the voids between the conductors to provide a tight seal. If desired, any excess space in the central recess of the package structure may be similarly filled with epoxy or it may simply be left void.

Of course it will be understood that where a definite production volume is known the package configuration once designed and tested by the building block technique shown in FIGS. 3, 4 and 5 is committed oto molds and tooling so that the entire magnetic package structure can be fabricated by the powder compaction and molding technique indicated above.

Figure 6:
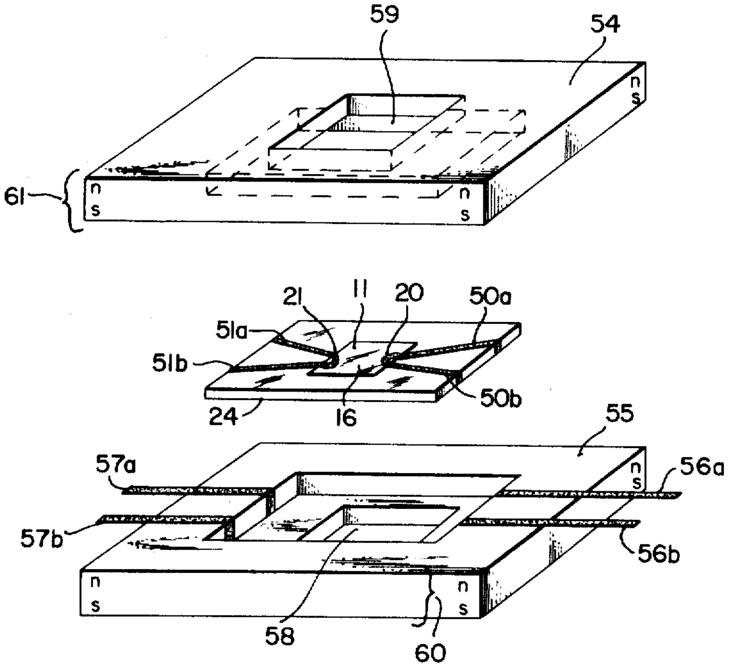
FIG. 6 is an exploded perspective view showing a third form of packaging arrangement.

Such a molded package arrangement having both its lower and upper members similar to the completed magnetic member shown in FIG. 5 and thereby eliminating the necessity for exterior glass base plates or cover plates is shown in FIG. 6. In FIG. 6 the uniaxially anisotropic magnetic crystal platelet or wafer 11 is shown mounted as previously on the glass plate 24 with the sensor element 20 and write conductor 21 on the wafer. In this version conductors 50*a* and 50*b* are connected to the lead or sensor circuit 20 whereas conductors 51*a* and 51*b* are connected to the write circuit 21. Each of these conductors, however, terminate at the edge of the glass plate 24.

The wafer and glass plate assembly is encapsulated into an electrically insulating magnetic structure which is formed from an upper member 54 and a lower member 55. Each of these members is molded by power-compaction techniques from a barium ferrite ceramic material as noted above and is shaped to be generally square in outer configuration and having an interior apertured recess of the same configuration shown in FIG. 4. Electrical conductors generally of a beam lead style such as the leads 56*a* and 56*b* are bonded to the upper surface of the lower member 55 and extend down the inner wall of the recess in a position to abut the conductors 50*a* and 50*b* when the glass plate is positioned into the recess. Of course a suitable solder or welded conductor joint is formed at that time. Similar leads 57*a* and 57*b* are positioned on the opposite edge of the package member 55 and extend into the recess in a position to be joined to conductors 51*a* and 51*b* on the plate member 24. Once this plate is in position in the central recess in the lower plate 55 and the electrical connections have been made, the upper magnetic package member 54 (which may also contain one or more active devices not shown but intended to be stacked above the device 11) is bonded to the lower member by a suitable adhesive such as epoxy. The central apertures 58 and 59 in the lower and upper package members respectively may either be left void or they may preferably be filled with transparent epoxy or any suitable potting compound. Preferably, however, any material used to fill these apertures should be not only nonmagnetic but also transparent. Magnetic bias for operation of the active devices in the chip 11 is obtained from the remanent field of the magnetic square rings 54 and 55 and will flood the aperture of the assembled device in which the platelet 11 is positioned. Field direction is indicated by the letters N and S bracketed as at 60 and 61 in the lower and upper members respectively. The direction of the magnetic field in each of the two members is here shown as being coaligned so that they will reinforce each other to form a single toroidal magnet. It will be understood, however, that more than one plate 24 and wafer 11 may be included in a single package and that in some of the more complex devices such as correlators in which such plates are stacked on top of each other it may be desirable to reverse the direction of magnetization of one of the members so that the two fields are opposing each other. In this or other complex devices in which more than one platelet is included in the package, it may be desirable to bring lead members of any necessary number out from each of the four sides of the package as shown, or if necessary, through the edges of the central apertures 58 and 59. If the four sides of both the upper and lower surfaces of both member 54 and 55 are used as well as the four edges or interior side walls of each of both central apertures 58 and 59 one obtains twenty-four separate electrically insulating conductor termination pads in this compact package to each of which a separate set of electrical conductors may be bonded if necessary for operation of complex minaturized devices housed in the package. It is thus obvious that the packaging configuration shown in FIG. 6 affords a very large area of possible electrical connections for access to outside circuitry while at the same time minimizing the size of the package necessary to achieve both this end and to provide the magnetic bias necessary for operation of the devices.

It should be noted that in all configurations of my invention, it is possible to "trim" the magnetic bias field flooding the central aperture by exposing the completed device to a very intense pulsed magnetic field of suitable polarity while monitoring the bubble action through the central aperture by means of the magneto-optical Faraday effect. The pulses will adjust the remanent magnetization of the ferrite package to obtain optimal bias level and device performance.

It should also be noted that while it is usually desirable to exclude external magnetic fields in the completed operating device by suitable magnetic shielding, there exist applications in which the completed device is immersed into an extraneous field which can provide switching and control functions and overrule the internal logic.

What is claimed is:

1. In combination:

a. a digital signal translating device of the type employing mobile magnetic domains in uniaxially anisotropic magnetic media capable of sustaining said domains in the presence of a predetermined magnetic biasing field and operative in response to electrical signals applied to said device over electrical conductors while such magnetic bias field is simultaneously applied thereto to move said magnetic domains between predtermined locations in said magnetic media;

b. a package protectively enclosing said device, said package having means forming a rigid structural frame member of said package and consisting of a material which is both a high coercivity permanent magnet and an electrical insulator for simultaneously providing said package structural member, a magnetic biasing field, and an electrically insulating terminal strip for said conductors providing said electrical signals to said device in said package;

c. means to support said device within said frame member in fixed relationship thereto;

d. said support means including an optically non-distorting transparent portion positioned to permit visual inspection of said signal translating device during manufacturing assembly of said package device to determine by a visual image of said magnetic material that the intended mobile domains have, in fact, been created at the desired locations;

e. electrical conductors for terminating the circuits of said signal translating device, said electrical conductors being insulatively supported by said frame member; and, f. electrically insulating cover means to close said package, said cover means including a transparent portion aligned with said transparent portion of said support means to permit said visual inspection of said signal translating device, said structrual frame member entirely surrounding said signal translating device in at least one plane of said device and said insulating cover means and said support means forming with said structural frame member a totally closed package in which said signal translating device is housed.

2. In combination:

a. a digital signal translating device of the type employing mobile magnetic domains in uniaxially anisotropic magnetic media capable of sustaining said domains in the presence of a predetermined magnetic biasing field and operative in response to electrical signals applied to said device over electrical conductors while such magnetic bias field is simultaneously applied thereto to move said magnetic domains between predetermined locations in said magnetic media;

b. a package protectively enclosing said device, said package having means forming a rigid structural frame member of said package and consisting of a material which is both a high coercivity permanent magnet and an electrical insulator for simultaneously providing said package structrual member, a magnetic biasing field, and an electrically insulating terminal strip for said conductors providing said electrical signals to said device in said package;

c. means to support said device within said frame member in fixed relationship thereto;

d. electrical conductors for terminating the circuits of said signal translating device, said electrical conductors being insulatively supported by said frame member; and, e. electrically insulating cover means to close said package, said structural frame member forming an aperture magnet and entirely surrounding said signal translating device in at least one plane of said device to provide said biasing field therefor by the central aperture field of said magnet which is directed perpendicularly to said plane, said insulating cover means and said support means forming with said structural frame member a totally closed package in which said signal translating device is housed, and said insulating cover means coacting with said frame member to provide protective and insulative termination for said electrical conductors.

3. In combination:

a. a digital signal translating device of the type employing mobile magnetic domains in uniaxially anisotropic magnetic media capable of sustaining said domains in the presence of a predetermined magnetic biasing field and operative in response to electrical signals applied to said device over electrical conductors while such magnetic bias field is simultaneously applied thereto to move said magnetic domains between predetermined locations in said magnetic media;

b. a package for said device, said package having means forming a rigid structural frame member of said package and consisting of a material which is both a high coercivity permanent magnet and an electrical insulator for simultaneously providing said package structrual member, a magnetic biasing field and an electrically insulating terminal strip for said conductors providing said electrical signals to said device in said package;

c. means to support said device within said frame member in fixed relationship thereto;

d. electrical conductors for terminating the circuits of said signal translating device, said electrical conductors being insulatively supported by said frame member for connection to external circuitry;

e. said structural frame member forming an aperture magnet entirely surrounding said signal translating device in at least one plane of said device to provide said biasing field therefor by the central aperture field of said magnet which is directed perpendicularly to said plane and said member also forming with said support means a package in which said signal translating device is protectively housed; and f. cover means to close said package.

4. A package for housing a digital signal translating device of the type employing mobile magnetic domains in uniaxially anisotropic magnetic media capable of sustaining said domains in the presence of a predetermined magnetic biasing field and operative in response to electrical signals applied to said device over electrical conductors while such magnetic bias field is simultaneously applied thereto to move said magnetic domains between predetermined locations in said magnetic media, said package comprising:

a. means forming a rigid structural frame member of said package and consisting of a material which is both a high coercivity permanent magnet and an electrical insulator for simultaneously providing said package structural member, a magnetic biasing field, and an electrically insulating terminal strip for said conductors;

b. means to support said device within said frame member in fixed relationship thereto;

c. said support means including an optically non-distorting transparent portion positioned to permit visual inspection of said signal translating device during manufacturing assembly of said package device to determine by a visual inspection of said signal translating device that the intended mobile domains have, in fact, been created at the desired location; and, d. electrically insulating cover means shaped to close said package, said cover means including a transpatent portion alignable with said transparent portion of said support means to permit visual inspection of said signal translating device, said structural frame member being shaped to entirely surround said signal translating device when said device is placed in said package in at least one plane of said device, said insulating cover means and said support means forming when assembled with said structural frame member a totally closed package in which said signal translating device may be housed, and said insulating cover means coacting with said frame member to provide protective and insulative termination for said electrical conductors.

5. A package for housing a digital siganl translating device of the type employing mobile magnetic domains in uniaxially anisotropic magnetic media capable of sustaining said domains in the presence of a predetermined magnetic biasing field and operative in response to electrical signals applied to said device over electrical conductors while such magnetic bias field is simultaneously applied thereto to move said magnetic domains between predetermined locations in said magnetic media, said package comprising:

a. means forming a rigid structural frame member of said package and consisting of a material which is both a high coercivity permanent magnet and an electrical insulator for simultaneously providing said package structural member, a magnetic biasing field and an electrically insulating terminal strip for said conductors;

b. means to support said device within said frame member in fixed relationship thereto;

c. said frame member providing means to insulatively support electrical conductors for terminating the circuits of said translating device for connection to external circuitry;

d. said structural frame member forming an aperture magnet shaped to entirely surround said signal translating device in at least one plane of said device when said device is placed in said package to provide said biasing field for said device by the central aperture field of said magnet which is directed perpendicularly to said plane, and said member also forming with said support means a package in which said signal translating device may be protectively housed; and, e. cover means to coact with said frame member and said support means to entirely close said package.

* * * * *